United States Patent
Reyes et al.

(10) Patent No.: US 12,415,433 B2
(45) Date of Patent: Sep. 16, 2025

(54) CABLE TETHER FOR AN ELECTRIC VEHICLE CHARGING CABLE

(71) Applicant: ChargePoint, Inc., Campbell, CA (US)

(72) Inventors: Stan C. Reyes, San Jose, CA (US); William Rich, Emerald Hills, CA (US); John Hsudan Yu, Fremont, CA (US); Kevin Fetterman, San Jose, CA (US); Aaron Dayton Little, Campbell, CA (US); Stephen Eric Sidle, Morgan Hill, CA (US); Pasquale Romano, Los Gatos, CA (US)

(73) Assignee: CHARGEPOINT, INC., Campbell, CA (US)

( * ) Notice: Subject to any disclaimer, the term of this patent is extended or adjusted under 35 U.S.C. 154(b) by 93 days.

(21) Appl. No.: 18/459,074

(22) Filed: Aug. 31, 2023

(65) Prior Publication Data

US 2024/0391337 A1   Nov. 28, 2024

Related U.S. Application Data

(60) Provisional application No. 63/402,817, filed on Aug. 31, 2022.

(51) Int. Cl.
| | |
|---|---|
| B60L 53/00 | (2019.01) |
| B60L 53/18 | (2019.01) |
| B60L 53/31 | (2019.01) |
| H02G 3/00 | (2006.01) |

(52) U.S. Cl.
CPC ............... B60L 53/31 (2019.02); B60L 53/18 (2019.02); H02G 3/26 (2013.01)

(58) Field of Classification Search
CPC ............ B60L 53/31; B60L 53/18; H02G 3/26
See application file for complete search history.

(56) References Cited

U.S. PATENT DOCUMENTS

| | | | | |
|---|---|---|---|---|
| 5,847,537 | A | * 12/1998 | Parmley, Sr. | ............ B60L 8/003 |
| | | | | 52/79.9 |
| 2022/0355687 | A1 | * 11/2022 | Gilchrest | ................ B60L 53/31 |
| 2023/0256841 | A1 | * 8/2023 | Steinbuchel, IV | ...... B60L 53/16 |
| | | | | 174/50 |

* cited by examiner

*Primary Examiner* — Pete T Lee
(74) *Attorney, Agent, or Firm* — NICHOLSON DE VOS WEBSTER & ELLIOTT LLP

(57) ABSTRACT

A cable tether for managing an electric vehicle charging cable is described. The cable tether comprises a housing that houses a spring clamp and a compression pad. The housing including an opening for the electric vehicle charging cable to pass through. The spring clamp includes two openings that allow a shaft member attached to an arm of the electric vehicle charging station to pass through, where a first segment of the spring clamp includes a first opening of the two openings and a portion that extends into the first opening, and where the portion that extends into the first opening slots into a cutout portion of the shaft member as the shaft member is passed through the two openings to latch the spring clamp onto the shaft member. The compression pad that is attached to the housing of the cable tether for gripping the electric vehicle charging cable.

16 Claims, 14 Drawing Sheets

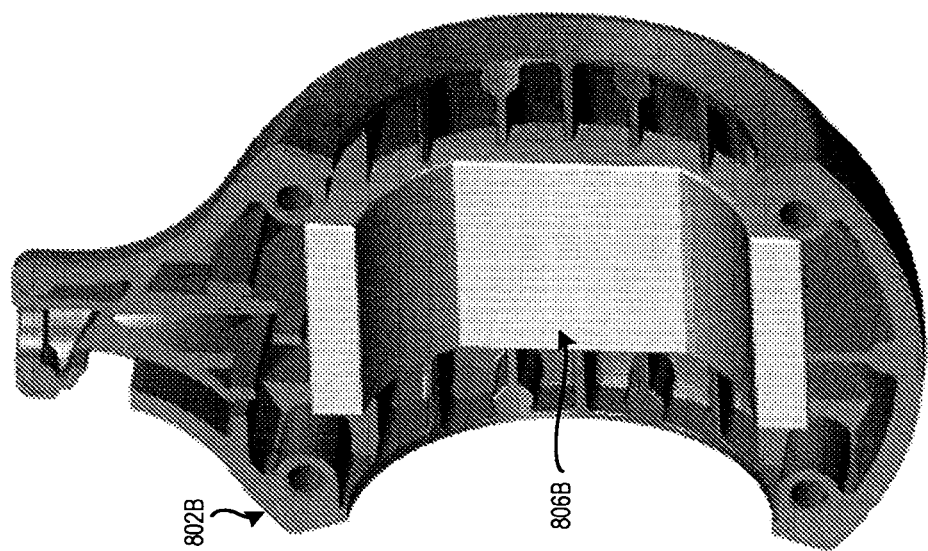
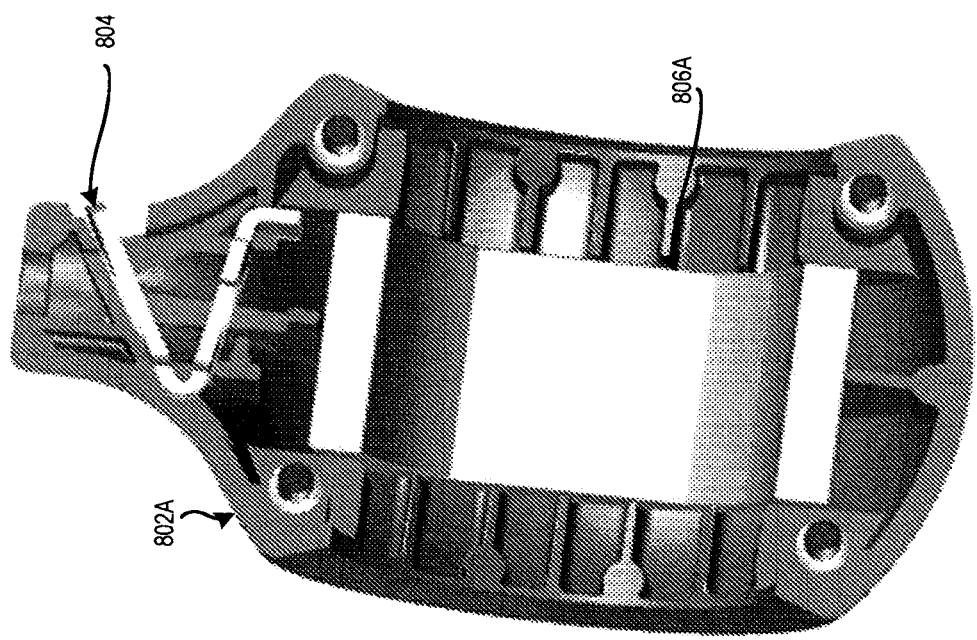
FIG. 8

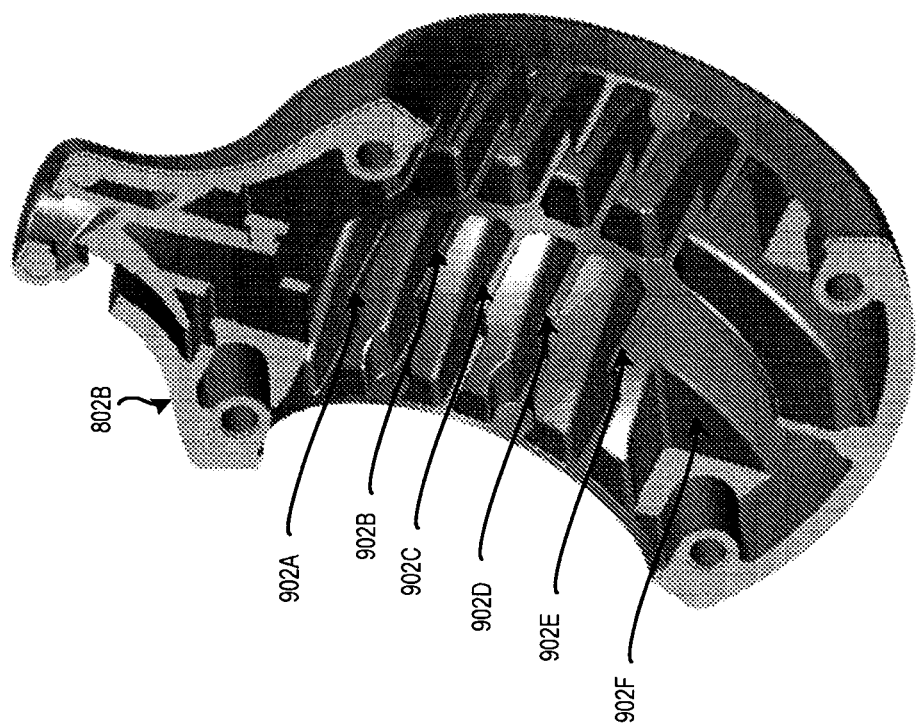
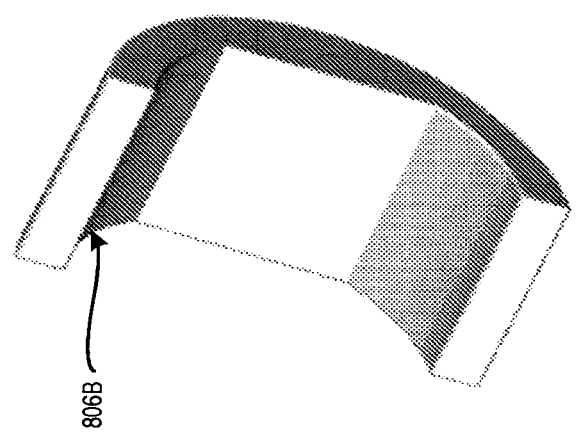
FIG. 9

CABLE TETHER FOR AN ELECTRIC VEHICLE CHARGING CABLE

CROSS-REFERENCE TO RELATED APPLICATIONS

This application claims the benefit of U.S. Provisional Application No. 63/402,817, filed Aug. 31, 2022, which is hereby incorporated by reference.

FIELD

Embodiments of the invention relate to the field of electric vehicle charging; and more specifically, to a cable tether for managing an electric vehicle charging cable.

BACKGROUND

Electric vehicle charging station (sometimes referred to as electric vehicle supply equipment (EVSE)) include charging cables with connectors that supply electrical power to electric vehicles. As the number of electric vehicles increases, the demand for electric vehicle charging stations increases. These electric vehicle charging stations can experience significant wear and tear from use, including damage to charging cables and the electric vehicle charging stations themselves.

SUMMARY

An aspect includes a cable tether for managing an electric vehicle charging cable of an electric vehicle charging station. The cable tether includes a housing that houses a spring clamp and a compression pad, the housing including an opening for the electric vehicle charging cable to pass through. The cable tether also includes the spring clamp that is attached to the housing of the cable tether. The spring clamp includes two openings that allow a shaft member attached to an arm of the electric vehicle charging station to pass through. A first segment of the spring clamp includes a first opening of the two openings and a portion that extends into the first opening. The portion that extends into the first opening slots into a cutout portion of the shaft member as the shaft member is passed through the two openings to latch the spring clamp onto the shaft member. The cable tether also includes the compression pad that is attached to the housing of the cable tether for gripping the electric vehicle charging cable.

An aspect includes the portion that extends into the first opening deforming during a breakaway event causing the housing to separate from the shaft member.

BRIEF DESCRIPTION OF THE DRAWINGS

The invention may best be understood by referring to the following description and accompanying drawings that are used to illustrate embodiments of the invention. In the drawings:

FIG. 8 illustrates an interior view of the cable tether according to an embodiment.

FIG. 9 illustrates an exploded view of some components of a cable tether shown in FIG. 8 according to an embodiment.

DESCRIPTION OF EMBODIMENTS

A cable tether for managing an electric vehicle charging cable of an electric vehicle charging station is described. The cable tether is suspended from an electric vehicle charging station cable management structure and holds an electric vehicle charging cable using compression pads housed within the cable tether. Suspending the electric vehicle charging cable using the cable tether prevents the electric vehicle charging cable from resting on the ground and shifts some of the weight of the electric vehicle charging cable, allowing for easier movement and maneuvering of the electric vehicle charging cable connector by a user. In an embodiment, the cable tether includes a spring clamp, disposed within the cable tether. The spring clamp includes a portion that latches into a cutout portion of a shaft member of the electric vehicle charging station cable management structure. The cable tether can be easily installed, or latched, onto the shaft member without requiring any tools.

In an embodiment, the portion of the spring clamp that latches, or slots, into the cutout portion of the shaft member may be designed to deform in response to a breakaway event (e.g., a force on the spring clamp greater than 285 pounds). When the portion of the spring clamp deforms, responsive to the breakaway event, the portion withdraws from the cutout portion of the shaft member causing the cable tether to detach from the shaft member.

Embodiments of the invention provide technical advantages, in addition to addressing the deficiencies of previous solutions. For example, the detachment of the cable tether from the electric vehicle charging station cable management structure, responsive to a breakaway event, prevents catastrophic damage to the electric vehicle charging station cable management structure and to the electric vehicle charging station cable management structure electric vehicle charging station. Further, because the compression pad housed within the cable tether housing is removable and can be of varying sizes, the cable tether is configurable to accept different size electric vehicle charging cables.

Figure 1:
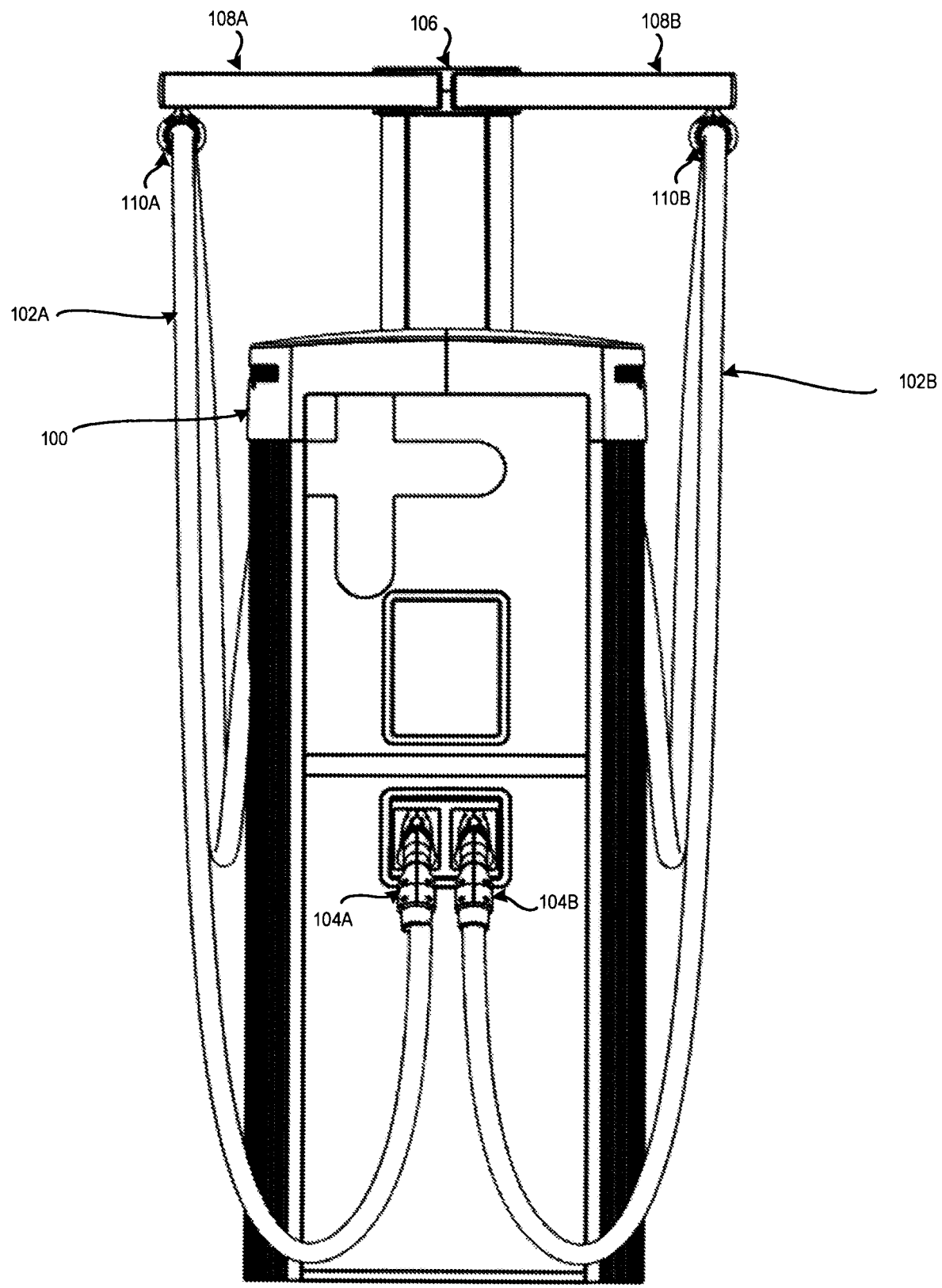
FIG. 1 illustrates a front view of an exemplary electric vehicle charging station according to an embodiment.

FIG. 1 illustrates a front view of an exemplary electric vehicle charging station according to an embodiment. The electric vehicle charging station 100 includes electric vehicle charging cables 102A and 102B connected to charging connectors 104A and 104B, for supplying electrical power to an electric vehicle. As illustrated in FIG. 1, an electric vehicle charging station 100 includes an electric vehicle charging station cable management structure 106. The electric vehicle charging station cable management structure 106 includes arms 108A and 108B from which cable tether 110A and cable tether 110B can be suspended. In an embodiment, the arms 108A and 108B are swing arms that further allow the electric vehicle charging cable to extend a greater distance from the electric vehicle charging station towards an electric vehicle. While FIG. 1 depicts the electric vehicle charging station cable management structure 106 with two arms, in some embodiments, the electric vehicle charging station cable management structure 106 can include one arm or more than two arms.

As shown in FIG. 1, electric vehicle charging cables 102A and 102B are passed through an opening of the cable tether 110A and cable tether 110B to suspend the electric vehicle charging cable and prevent the electric vehicle charging cables 102A and 102B from resting on the ground. The cable tether 110A and cable tether 110B are configured to are configured to grip onto electric vehicle charging cables 102A and 102B, respectively. In an embodiment, the cable tether 110B grips the electric vehicle charging cable 102B at the position of the electric vehicle charging cable 102B that is set within the opening of the cable tether 110B and prevents the electric vehicle charging cable 102B from sliding through the opening of the cable tether 110B.

Figure 2:
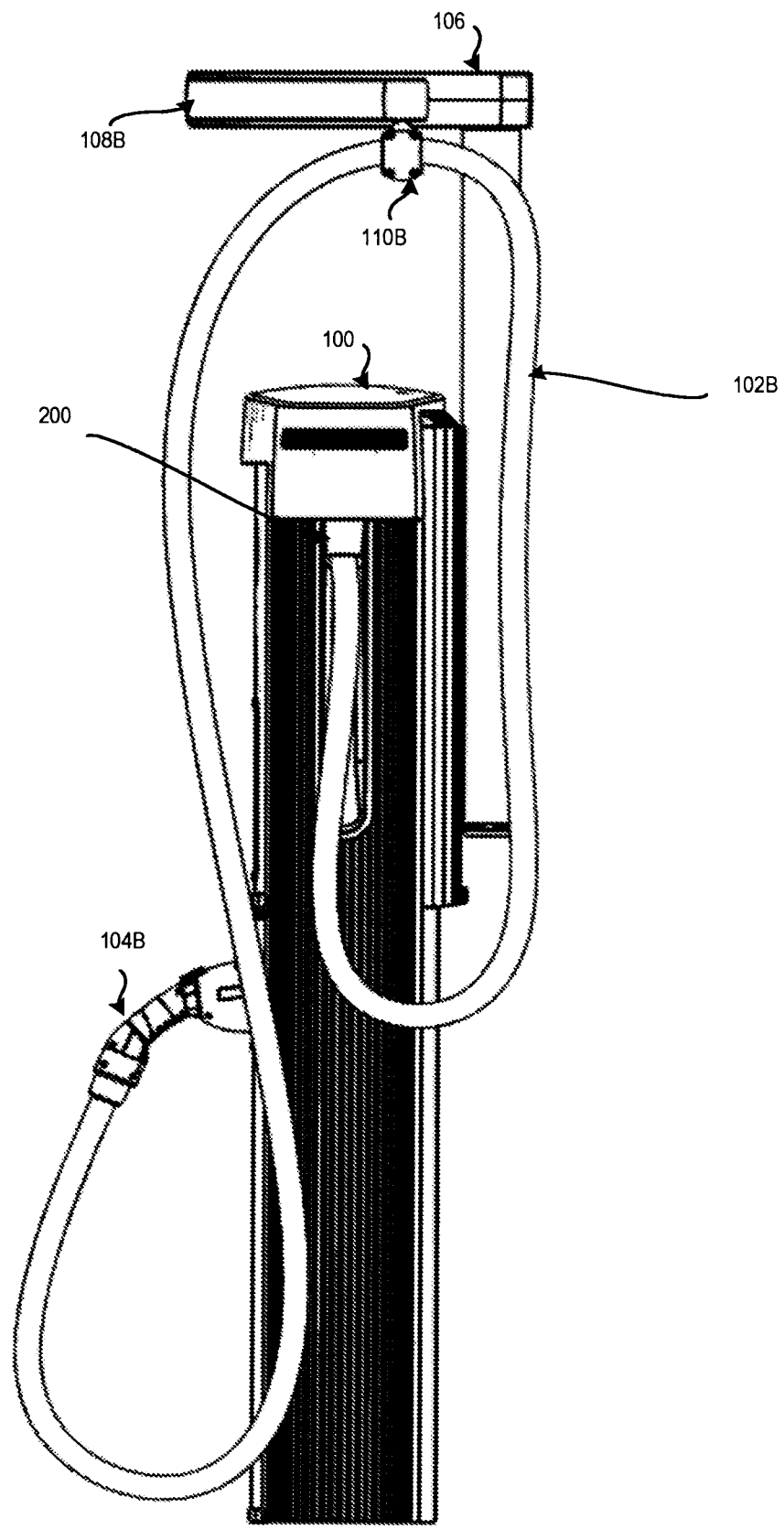
FIG. 2 illustrates a side view of an exemplary electric vehicle charging station shown in FIG. 1 according to an embodiment.

FIG. 2 illustrates a side view of an exemplary electric vehicle charging station shown in FIG. 1 according to an embodiment. As illustrated in FIG. 2, only arm 108B is attached to the electric vehicle charging station cable management structure 106. The electric vehicle charging cable 102B is attached to the electric vehicle charging station 100 at a connection point 200 at one end and to charging connector 104B at another end. The electric vehicle charging cable 102B passes through an opening of the cable tether 110B suspended from arm 108B.

Figure 3:
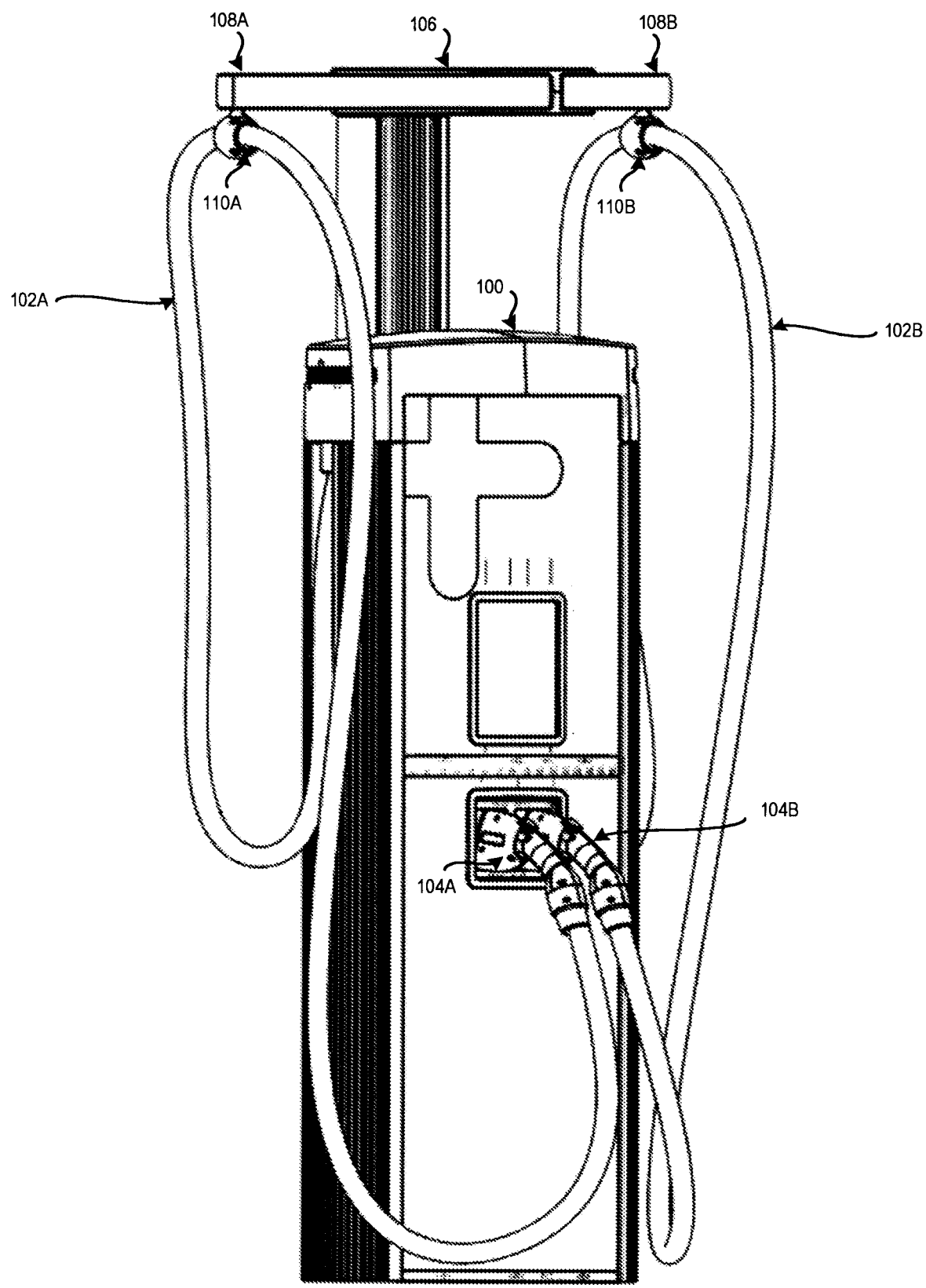
FIG. 3 illustrates a three-quarters view of an exemplary electric vehicle charging station shown in FIG. 1 according to an embodiment.

FIG. 3 illustrates a three-quarters view of an exemplary electric vehicle charging station shown in FIG. 1 according to an embodiment.

Figure 4:
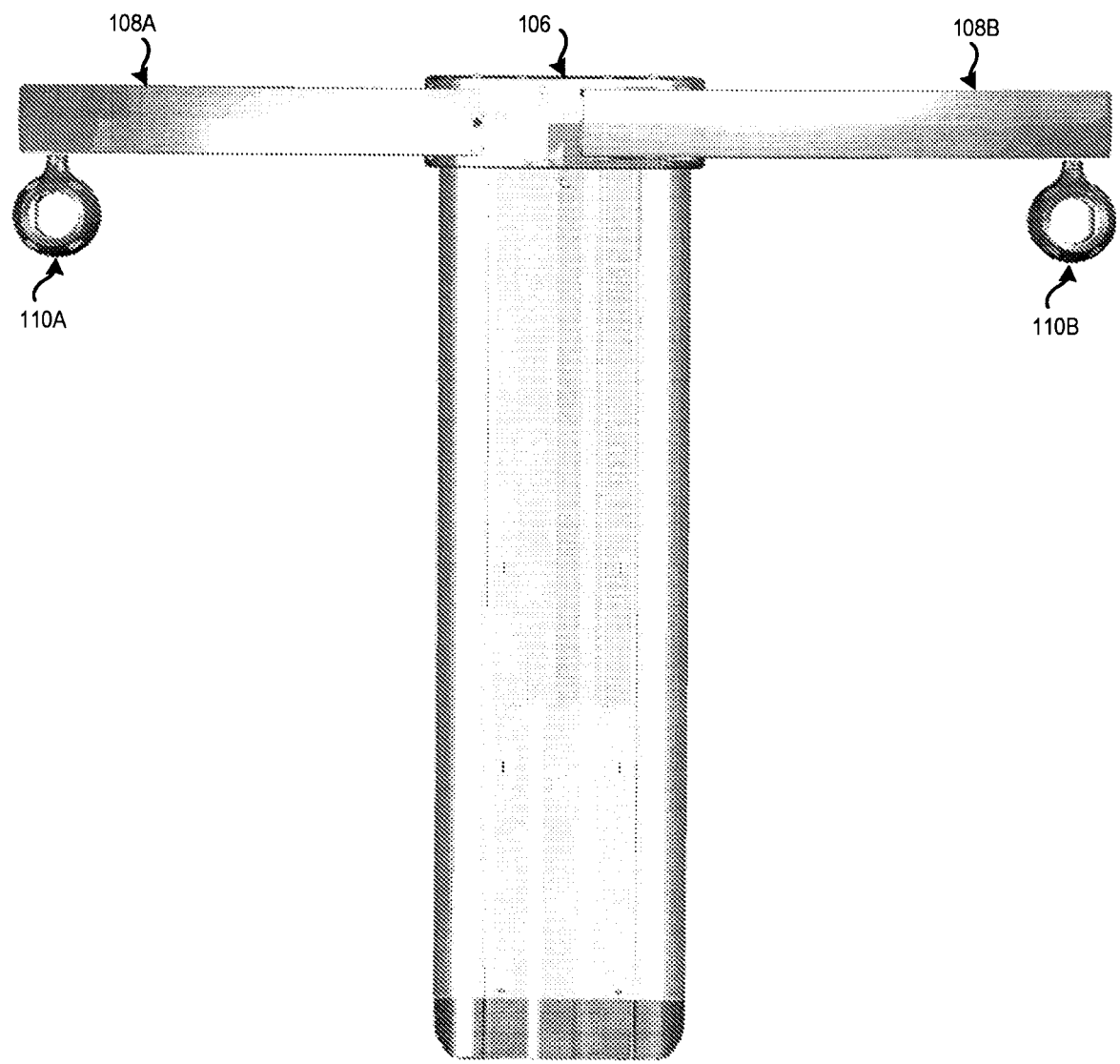
FIG. 4 illustrates an exemplary electric vehicle charging station cable management structure including cable tethers for managing an electric vehicle charging cable according to an embodiment.

FIG. 4 illustrates an exemplary electric vehicle charging station cable management structure including cable tethers for managing an electric vehicle charging cable according to an embodiment. FIG. 4 shows an electric vehicle charging station cable management structure 106 with arms 108A and 108B attached. In an embodiment, the electric vehicle charging station cable management structure 106 can be a separate housing that can be attached to an electric vehicle charging station. In other embodiments, the electric vehicle charging station cable management structure 106 can be integrated into an electric vehicle charging station. Cable tether 110A and cable tether 110B can be attached to the arm 108A and arm 108B, respectively, to allow the cable tether 110A and cable tether 110B to be suspended.

Figure 5:
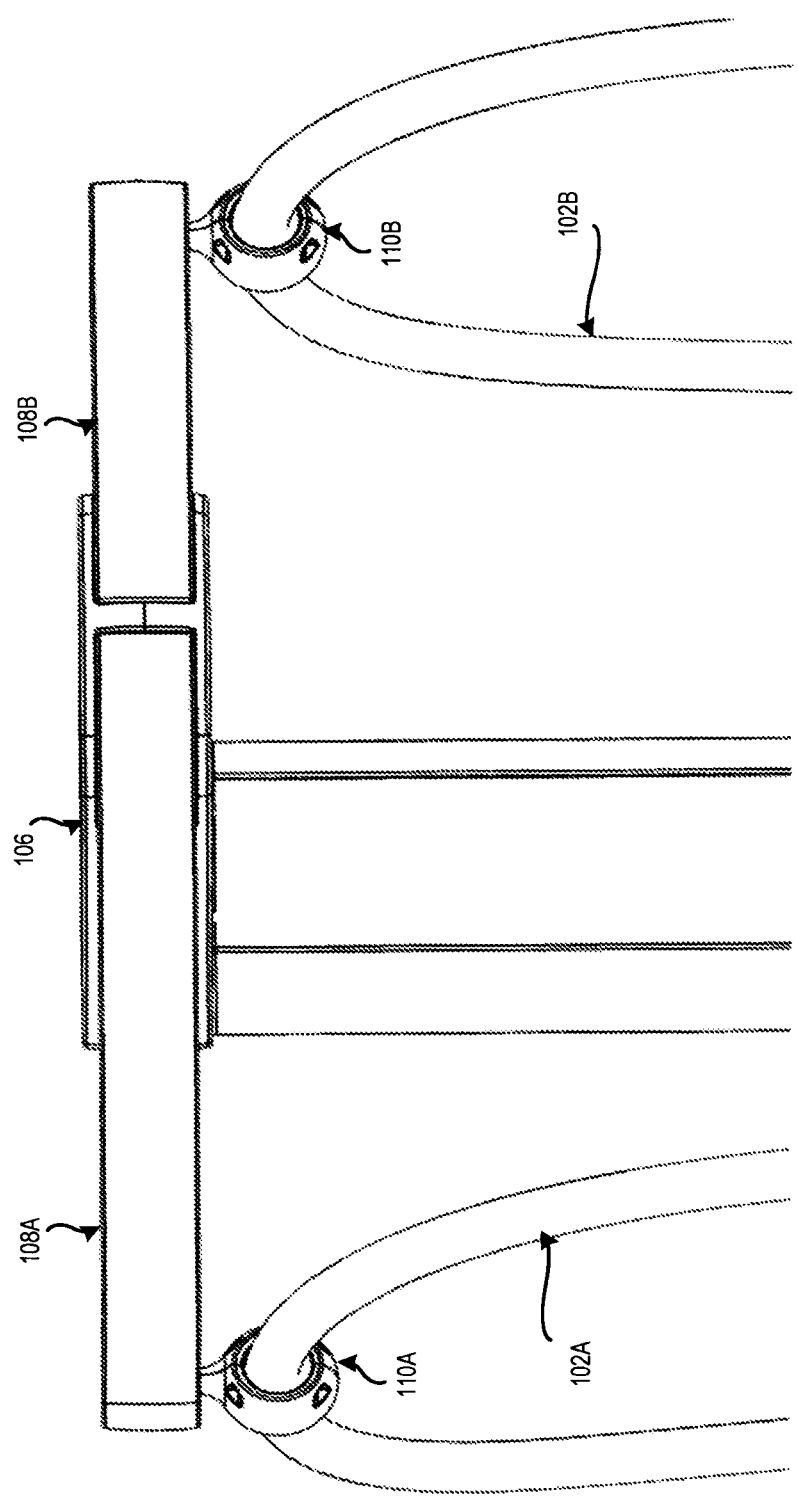
FIG. 5 illustrates a three-quarters view of an exemplary electric vehicle charging station cable management structure shown in FIG. 4 according to an embodiment.

FIG. 5 illustrates a three-quarters view of an exemplary electric vehicle charging station cable management structure shown in FIG. 4 according to an embodiment. FIG. 5 depicts a close-up view of the electric vehicle charging cable 102A and electric vehicle charging cable 102B gripped within openings of cable tether 110A and cable tether 110B, respectively.

Figure 6:
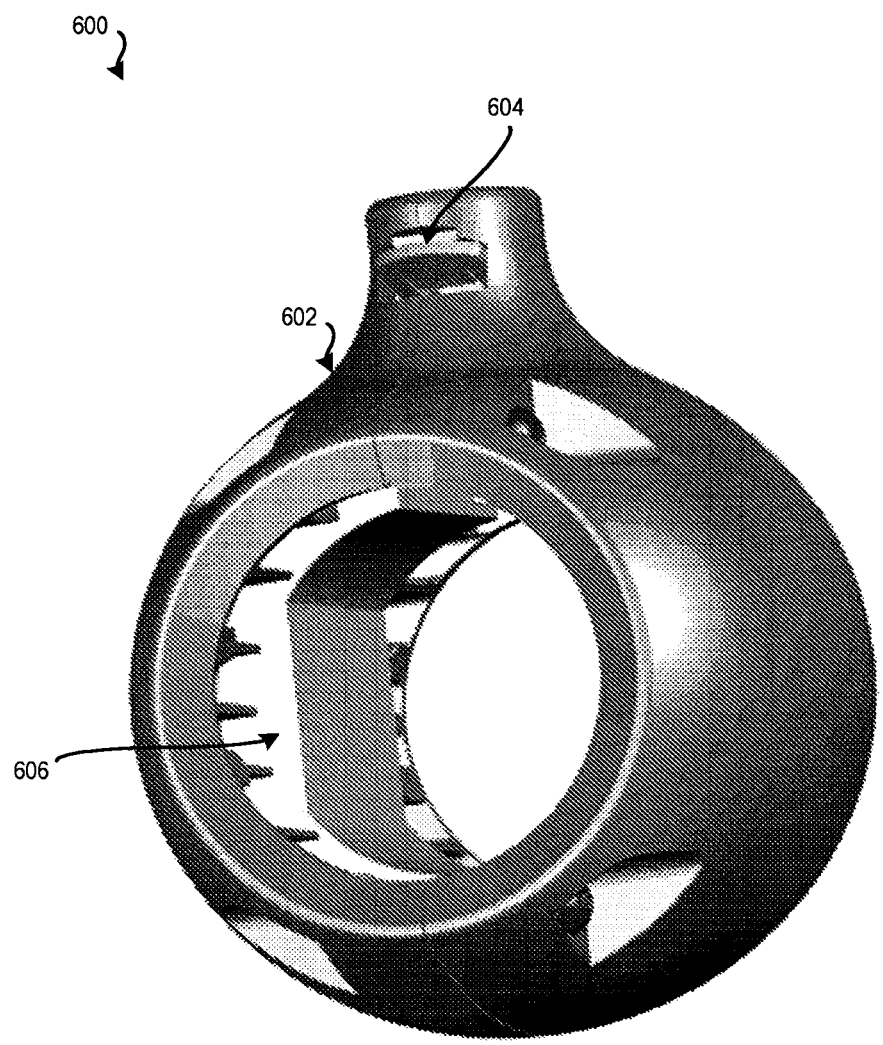
FIG. 6 illustrates an exemplary cable tether for managing an electric vehicle charging cable according to an embodiment.

FIG. 6 illustrates an exemplary cable tether for managing an electric vehicle charging cable according to an embodiment. FIG. 6 shows cable tether 600 that includes a housing 602 for containing a spring clamp 604 and one or more compression pads 606. As illustrated in FIG. 6, the housing 602 is formed by the attachment of two sections. The number of sections shown in FIG. 6 is exemplary as embodiments can include housings formed as a single section or greater than two sections.

Figure 7:
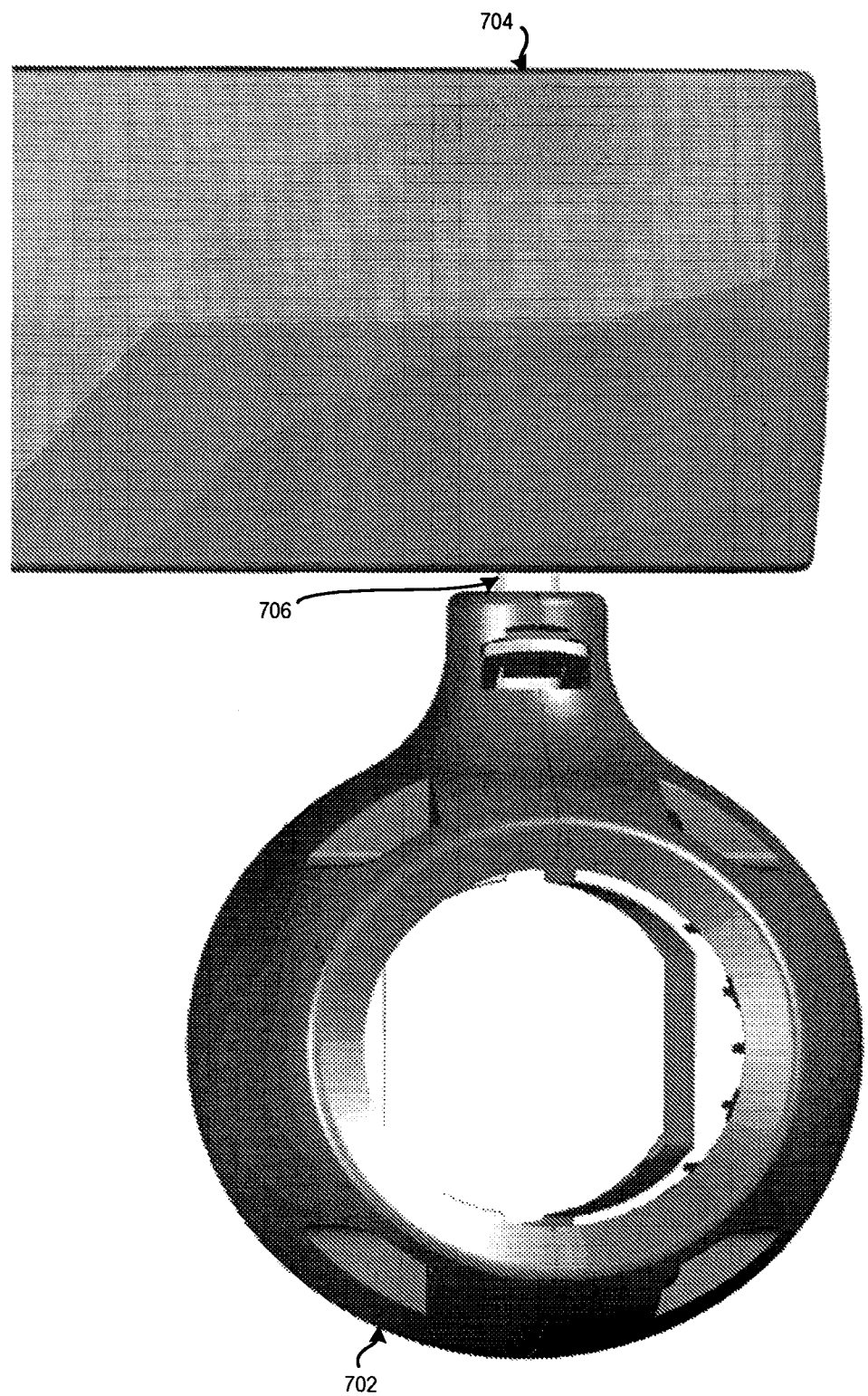
FIG. 7 illustrates an exemplary cable tether suspended from an arm of an electric vehicle charging station according to an embodiment.

FIG. 7 illustrates an exemplary cable tether suspended from an arm of an electric vehicle charging station according to an embodiment. As illustrated in FIG. 7, a cable tether 702 is suspended from an arm 704 of an electric vehicle charging station when the cable tether 702 is attached to a shaft member 706 disposed within, and protruding from, the arm 704 of the electric vehicle charging station. In some embodiments, the shaft member 706 is attached to a rotation enabling element within the arm 704 that allows the shaft member, and the attached cable tether, to rotate around a vertical axis.

FIG. 8 illustrates an interior view of the cable tether according to an embodiment. The embodiment illustrated in FIG. 8 illustrates the housing separated into a first housing section 802A and a second housing section 802B. In an embodiment, the first housing section 802A and the second housing section 802B are attached to form the housing (e.g., using one or more screws or other fastening devices). As illustrated in FIG. 8, each of the first housing section 802A and the second housing section 802B includes a compression pad 806A and a compression pad 806B, respectively, for gripping an electric vehicle charging cable when it is passed through an opening of the cable tether. Although FIG. 8 illustrate a cable tether with two separate compression pads (e.g., compression pad 806A and compression pad 806B), in other embodiments, the compression pad can be a single pad or greater than two pads.

In an embodiment, the compression pads 806A and 806B can vary in thickness to accommodate different sizes (e.g., diameters) of electric vehicle charging cables while keeping the same shape and size of cable tether housing. In some embodiments, the compression pads 806A and 806B can accommodate electric vehicle charging cables between 30 mm and 45 mm in diameter. Other embodiments can accommodate electric vehicle charging cables having smaller or greater diameters.

FIG. 9 illustrates an exploded view of some components of a cable tether shown in FIG. 8 according to an embodiment. FIG. 9 illustrates compression pad 806B separated from the second housing section 802B. The second housing section 802B includes a plurality of notches 902A-902F that are configured to receive the compression pad 806B. Other embodiments of the second housing section 802B can include fewer notches or a greater number of notches to receive the compression pad 806B. When the compression pad 806B is set into the plurality of notches 902A-902F, the compression pad 806B can be held in place in the second housing section 802B. The plurality of notches 902A-902F can be arranged in a number of different configurations in different embodiments. The first housing section 802A includes similar notches to receive the compression pad 806A. Although FIG. 8 shows notches for holding the compression pads, the compression pads may be fastened to the cable tether by other fastening mechanisms in another embodiment.

Figure 10:
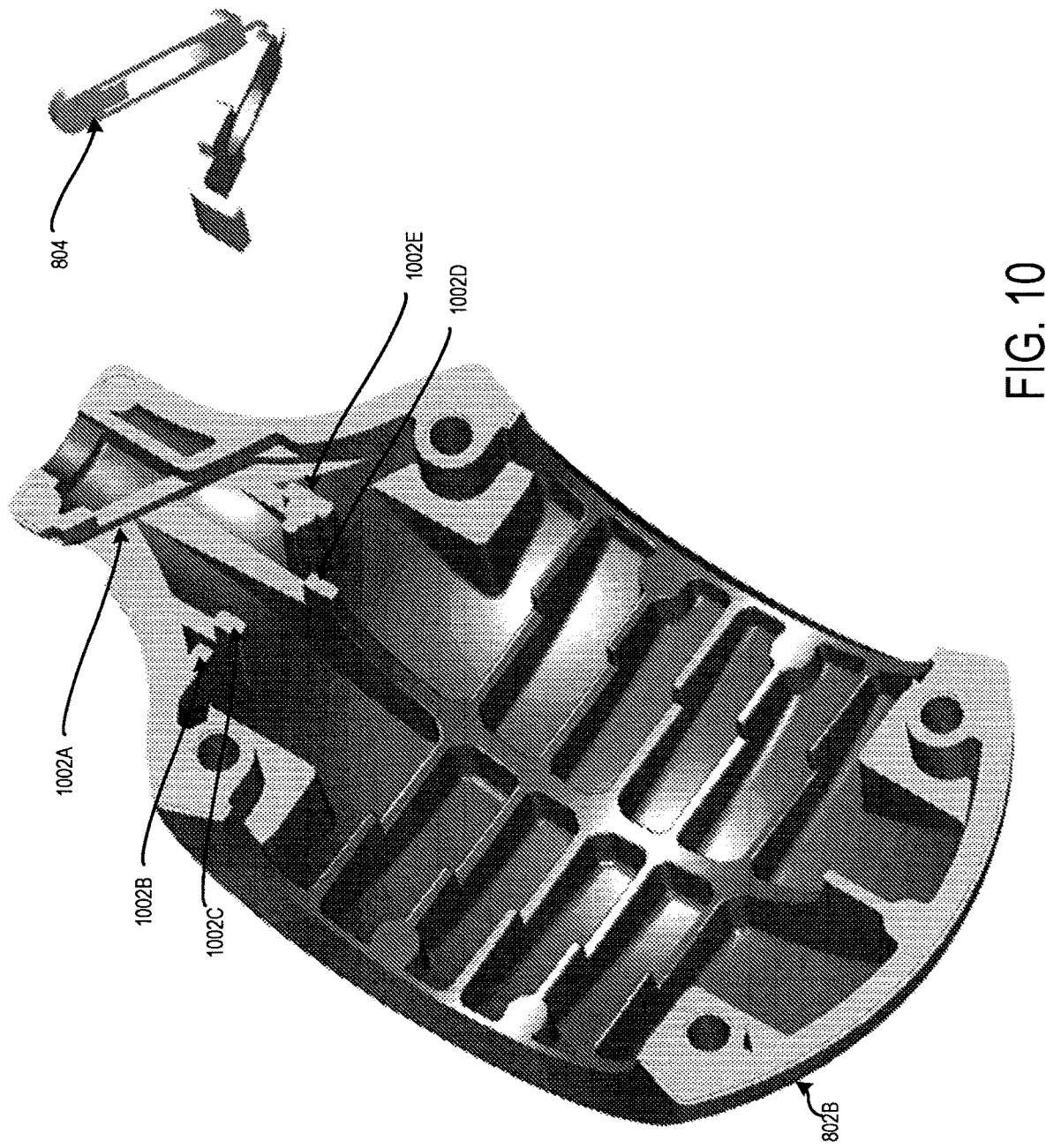
FIG. 10 illustrates an exploded view of some components of a cable tether shown in FIG. 8 according to an embodiment.

FIG. 10 illustrates an exploded view of some components of a cable tether shown in FIG. 8 according to an embodiment. FIG. 10 illustrates spring clamp 804 separated from the second housing section 802B. The second housing section 802B includes a plurality of notches 1002A-1002E that are configured to receive the spring clamp 804. Other embodiments of the second housing section 802B can include fewer notches or a greater number of notches to receive the spring clamp 804. When the spring clamp 804 is set into the plurality of notches 1002A-1002E, the spring clamp 804 can be held in place in the second housing section 802B. The plurality of notches 1002A-1002E can be arranged in a number of different configurations in different embodiments. The second housing section 802B includes similar notches to receive the spring clamp 804.

Figure 11:
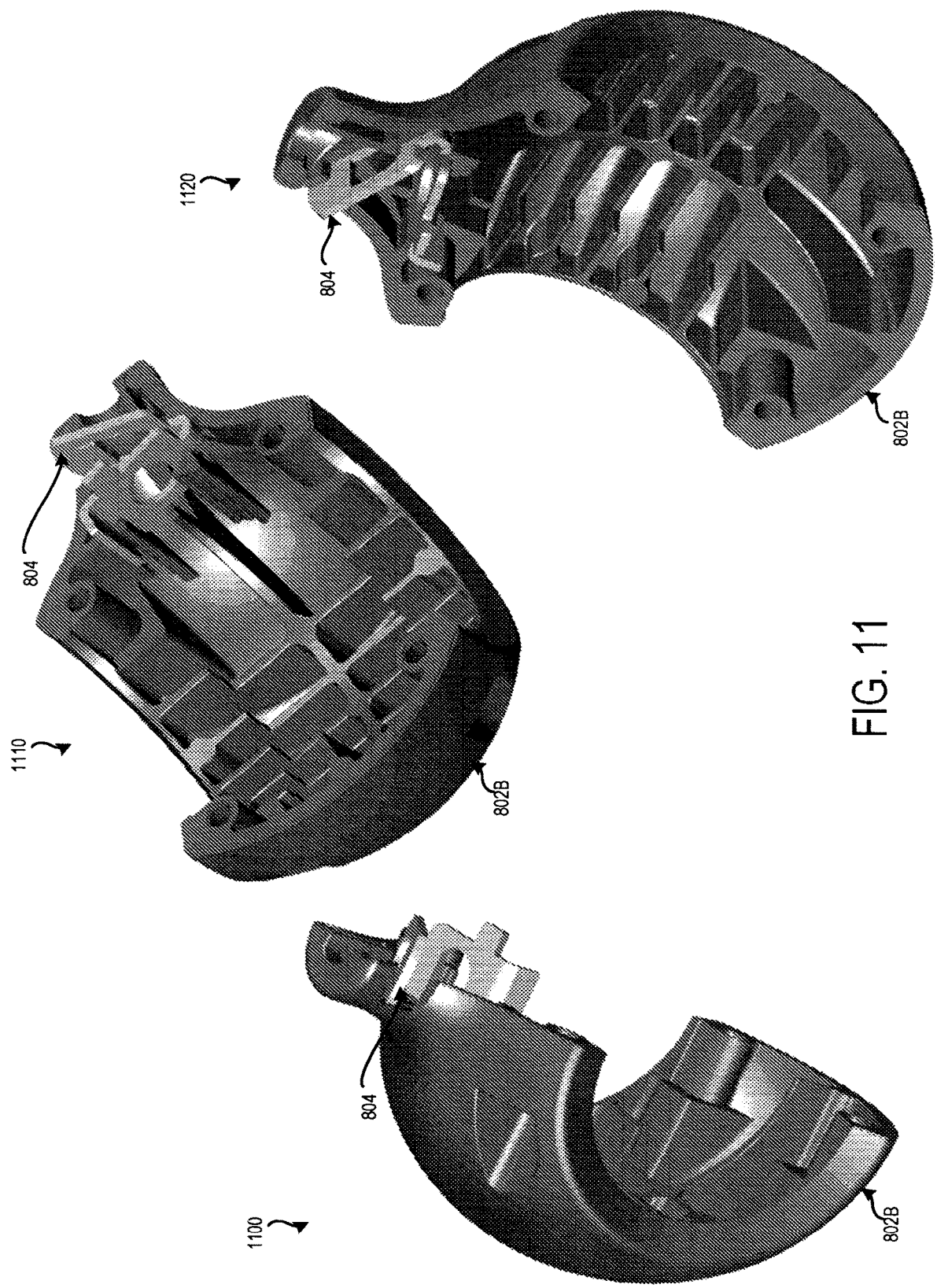
FIG. 11 illustrates multiple views of some components of a cable tether shown in FIG. 8 according to an embodiment.

FIG. 11 illustrates multiple views of some components of a cable tether shown in FIG. 8 according to an embodiment. The first view 1100 illustrates the spring clamp 804 partially disposed within notches of the second housing section 802B. The portions of the spring clamp 804 not disposed within the second housing section 802B will be disposed within the second housing section 802B when the second housing section 802B and the second housing section 802B are attached. The second view 1110 illustrates a below view of the spring clamp 804 partially disposed within notches of the second housing section 802B. The third view 1120 illustrates the spring clamp 804 partially disposed within notches of the second housing section 802B.

Figure 12:
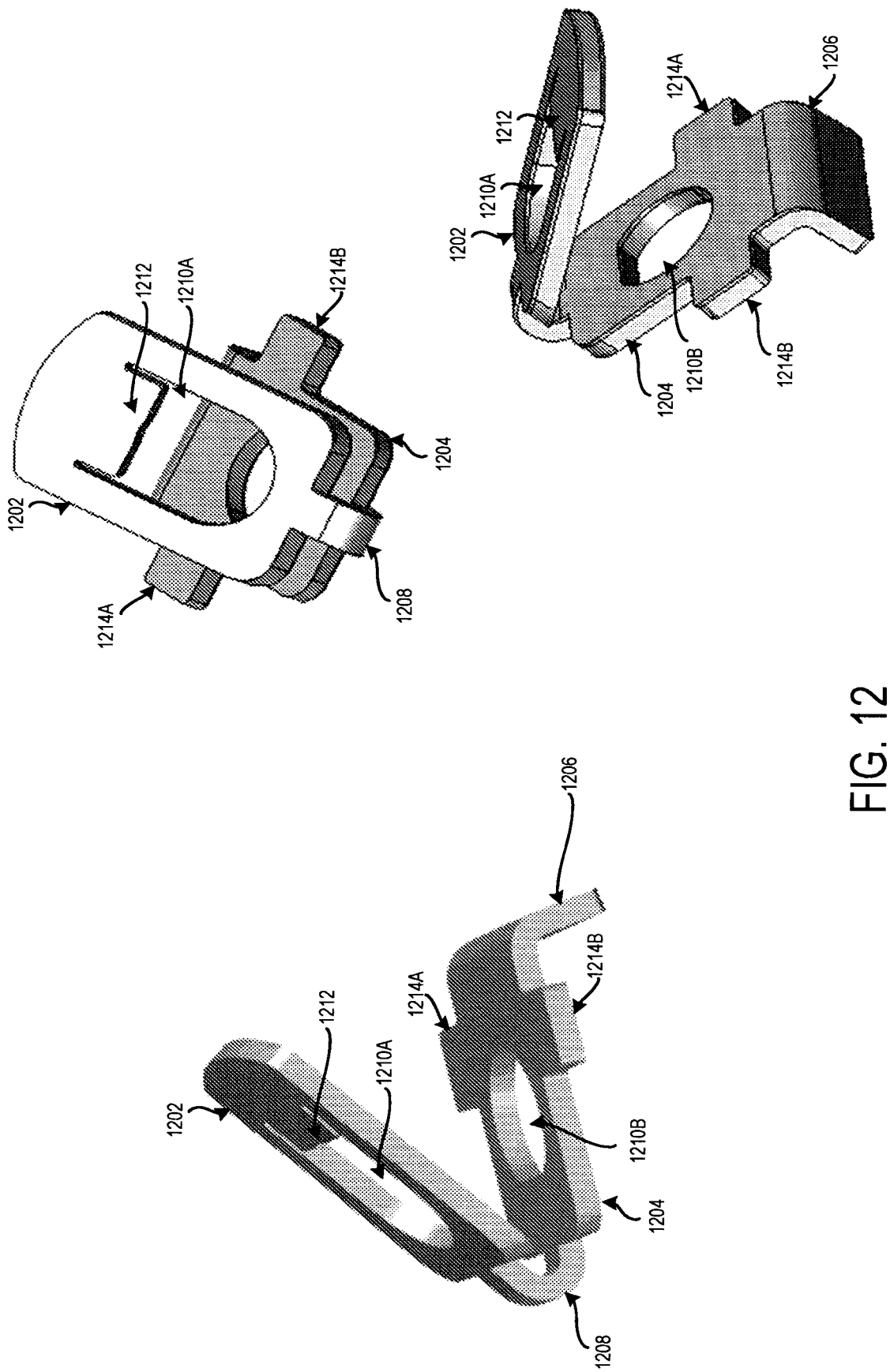
FIG. 12 illustrates views of a spring clamp according to an embodiment.

FIG. 12 illustrates views of a spring clamp according to an embodiment. As
illustrated in FIG. 12, the spring clamp (e.g., spring clamp 804 from FIG. 8) includes a first segment 1202, a second segment 1204, and a third segment 1206. The first segment 1202 and the second segment 1204 are joined by a spring portion 1208 that allows the first segment 1202 and the second segment 1204 to flex towards and away from each other. In one embodiments, the first segment 1202 and the second segment 1204 are held at an approximately 45 degree angle by the spring portion 1208 without the application of force to the spring clamp. The third segment 1206 when inserted into the cable tether housing constrains the spring clamp within the cable tether housing to prevent the cable tether from disengaging unintentionally from a shaft member.

As illustrated in FIG. 12, the first segment 1202 of the spring clamp includes a first opening 1210A and the second segment 1204 of the spring clamp includes a second opening 1210B. The first segment 1202 includes a portion 1212 that partially extends into the first opening 1210A. In one embodiment, the portion 1212 is a rectangular-shaped portion that extends into the first opening 1210A such that it is attached to the first segment 1202 on only a single side. In other embodiments, the portion 1212 can be another shape other than a rectangle. When the shaft member is passed through the first opening 1210A, the portion 1212 is configured to latch onto the shaft member when the portion 1212 is inserted, or slotted, into a cutout portion of the shaft member. The portion 1212 is configured to deform and/or break in response to a breakaway event, causing the portion 1212 to disengage from the cutout portion of the shaft member (e.g., to prevent damage to the shaft member, the electrical vehicle charging station, etc.).

As illustrated in FIG. 12, the second segment 1204 of the spring clamp includes winged portions 1214A and 1214B. In some embodiments, the winged portions 1214A and 1214B provide positional alignment and additional strength during rotational loading of the spring clamp within the cable tether housing.

Figure 13:
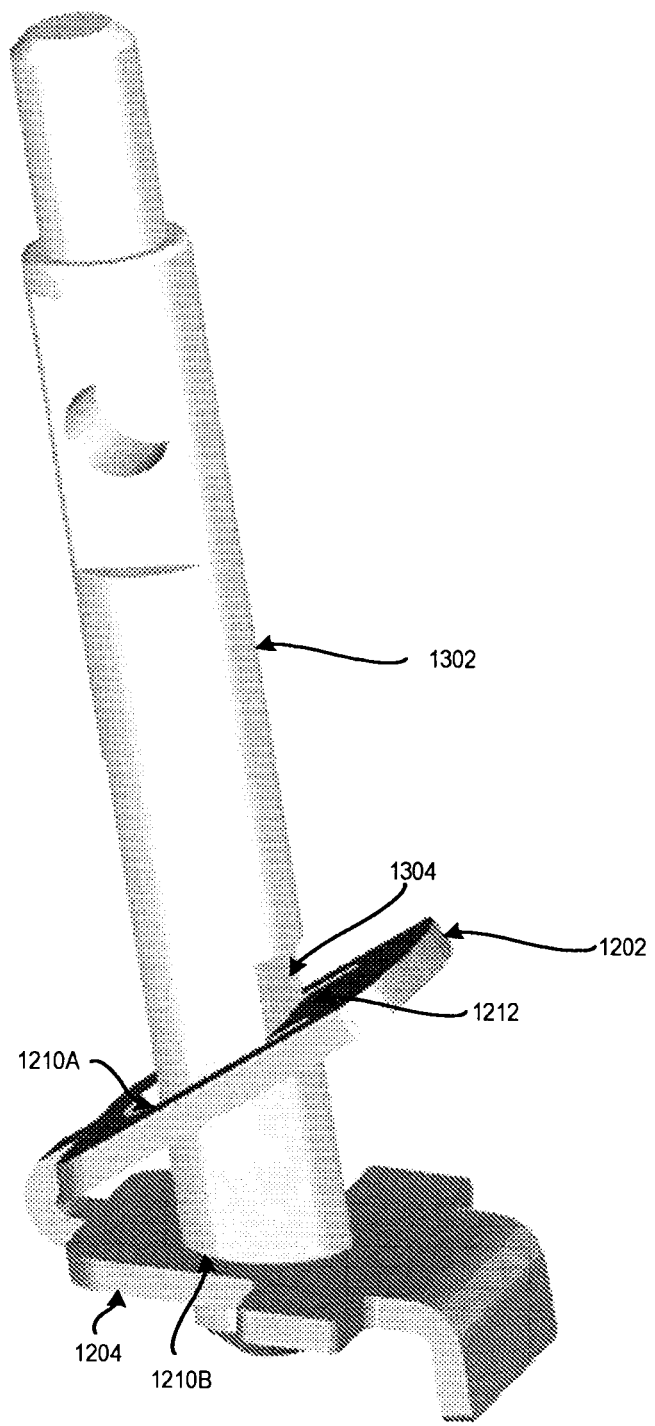
FIG. 13 illustrates a view of the spring clamp shown in FIG. 12 latched to a shaft member according to an embodiment.

FIG. 13 illustrates a view of the spring clamp shown in FIG. 12 latched to a shaft member according to an embodiment. As shown in FIG. 13, a shaft member 1302 has been inserted through a first opening 1210A of a first segment 1202 and through a second opening 1210B of a second segment 1204. As the shaft member M02 passes through the first opening 1210A and the second opening 1210B, the portion 1212 that partially extends into the first opening 1210A latches into a cutout portion 1304 of the shaft member 1302, causing the spring clamp to be latched onto the shaft member 1302. In some embodiments, when the spring clamp is disposed within a cable tether (e.g., cable tether 110A), the cable tether can be installed onto the shaft member 1302 without requiring any tools. Similarly, in some embodiments, the cable tether can be uninstalled, or detached from the shaft member 1302 without requiring any tools.

In some embodiments, the shaft member 1302 is connected to a rotation enabling element that allows the shaft member 1302, and a cable tether (e.g., cable tether 110A) latched to the shaft member 1302, to rotate around a vertical axis.

Figure 14:
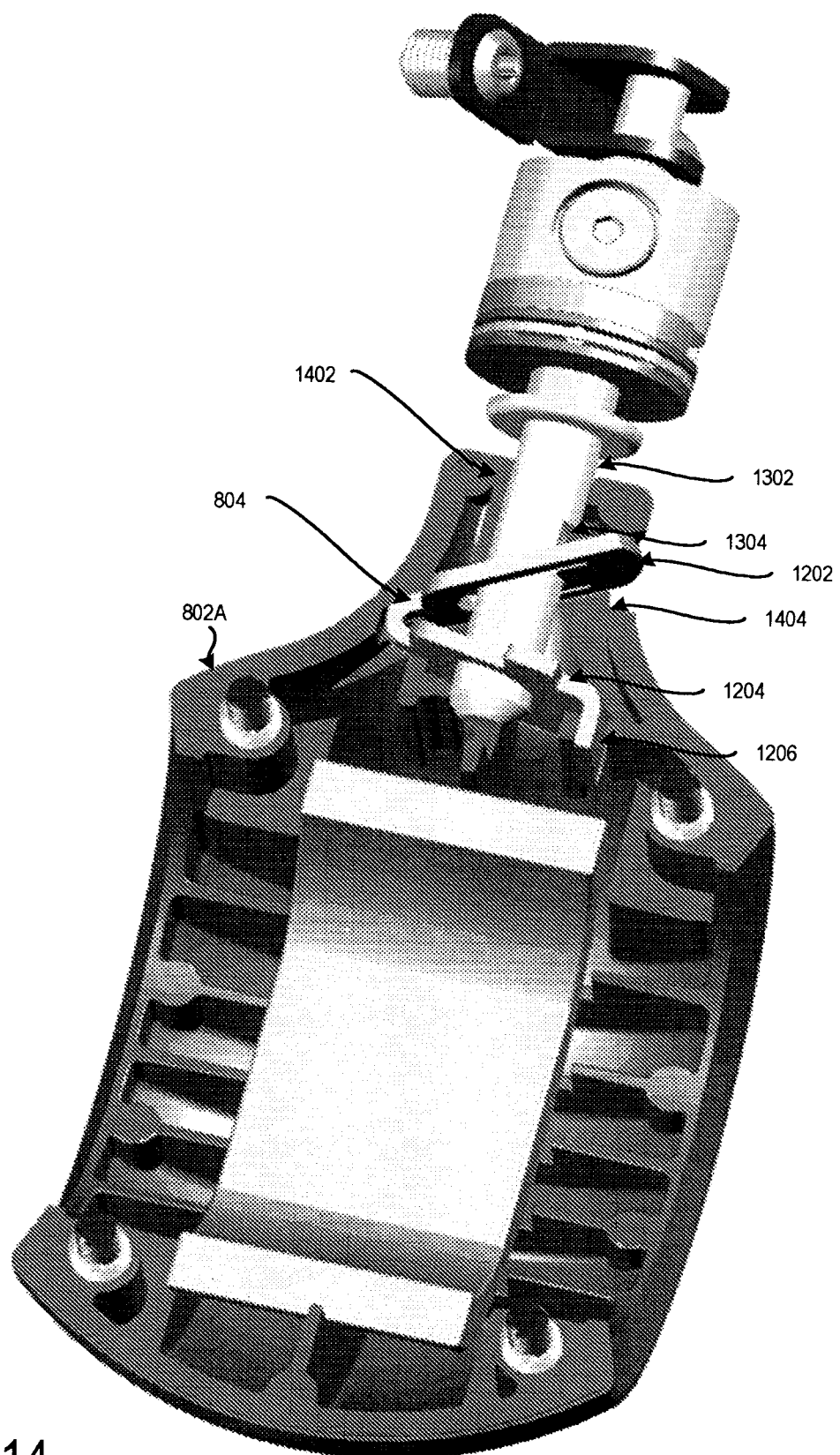
FIG. 14 illustrates an interior view of a cable tether latched to a shaft member of an electrical vehicle charging station according to an embodiment.

FIG. 14 illustrates an interior view of a cable tether latched to a shaft member of an electrical vehicle charging station according to an embodiment. FIG. 14 shows a first housing section 802A of a cable tether from FIG. 8, with a spring clamp 804 inset within the second housing section 802B. The spring clamp 804 includes a first segment 1202 that includes a first opening, a second segment 1204 that includes a second opening, and a third segment 1206. The cable tether is latched to the shaft member 1302 of the electrical vehicle charging station when a top opening 1402 of the cable tether housing is inserted onto the shaft member 1302. As the cable tether is inserted onto the shaft member 1302, the shaft member 1302 passes through the first opening of the first segment 1202 and the second opening of the second segment 1204. In an embodiment, the spring clamp 804 latches to the shaft member 1302 when a portion of the first segment 1202 that extends into the first opening is inserted into a cutout portion 1304 of the shaft member 1302.

In an embodiment, the first housing section 802A includes a cutout portion 1404. The first segment 1202 of the spring clamp 804 can include a portion that extends outside of the first housing section 802A through the cutout portion 1404. In some embodiments, the first housing section 802A can detach from the shaft member 1302 when the portion of the first segment 1202 that extends outside of the first housing section 802A through the cutout portion 1404 is depressed (e.g., from an initial location at a top of the cutout portion 1304 towards an ending location at a bottom of the cutout portion 1304), causing the portion of the first segment 1202 that extends into the first opening to removed or extracted from the cutout portion 1304 of the shaft member 1302. In some embodiments, the portion of the first segment 1202 that extends outside of the first housing section 802A through the cutout portion 1404 can be depressed by a user without using an tools. In other embodiments, the portion of the first segment 1202 that extends outside of the first housing section 802A through the cutout portion 1404 can be depressed using a tool (e.g., a flathead screwdriver or similar tool).

In some embodiments, the first housing section 802A is configured to detach from the shaft member 1302 during a breakaway event. In one embodiment, a breakaway event is the application of a force on the spring clamp 804 greater than 285 pounds. In a breakaway event, the portion of the first segment 1202 that extends into the first opening is configured to deform or break to cause the first housing section 802A to disengage from the shaft member 1302.

In the preceding description, numerous specific details are set forth to provide a more thorough understanding of the present invention. It will be appreciated, however, by one skilled in the art that embodiments can be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

While the invention has been described in terms of several embodiments, those skilled in the art will recognize that the invention is not limited to the embodiments described, can be practiced with modification and alteration within the spirit and scope of the appended claims. The description is thus to be regarded as illustrative rather than limiting.

What is claimed is:

1. A cable tether for managing an electric vehicle charging cable of an electric vehicle charging station comprising:
   a housing of the cable tether that houses a spring clamp and a compression pad, the housing including an opening for the electric vehicle charging cable to pass through;
   the spring clamp that is attached to the housing of the cable tether, the spring clamp including two openings that allow a shaft member attached to an arm of the electric vehicle charging station to pass through, wherein a first segment of the spring clamp includes a first opening of the two openings and a portion that extends into the first opening, and wherein the portion that extends into the first opening slots into a cutout portion of the shaft member as the shaft member is passed through the two openings to latch the spring clamp onto the shaft member; and
   the compression pad that is attached to the housing of the cable tether for gripping the electric vehicle charging cable.

2. The cable tether of claim 1, wherein the first segment of the spring clamp extends outside of the housing through a cutout portion of the housing, and wherein depressing the first segment from an initial location at a top of the cutout portion of the housing towards an ending location at a bottom of the cutout portion of the housing causes the spring clamp to disengage from the shaft member.

3. The cable tether of claim 1, wherein the portion that extends into the first opening deforms during a breakaway event causing the housing to separate from the shaft member.

4. The cable tether of claim 3, wherein the breakaway event is an application of a force greater than 285 pounds.

5. The cable tether of claim 1, wherein a second segment of the spring clamp includes a second opening of the two openings and winged portions.

6. The cable tether of claim 1, wherein a third segment of the spring clamp latches the spring clamp to the housing.

7. The cable tether of claim 1, wherein the cable tether is suspended from the arm of the electric vehicle charging station when the spring clamp is latched onto the shaft member to allow the cable tether to rotate around a vertical axis.

8. The cable tether of claim 1, wherein the housing further comprises:
   a first set of notches for holding the spring clamp; and
   a second set of notches for holding the compression pad, wherein the second set of notches accommodate different sizes of compression pads for different sizes of electric vehicle charging cables.

9. An electric vehicle charging station comprising:
   a cable tether for managing an electric vehicle charging cable of the electric vehicle charging station including:
      a housing of the cable tether that houses a spring clamp and a compression pad, the housing including an opening for the electric vehicle charging cable to pass through,
      the spring clamp that is attached to the housing of the cable tether, the spring clamp including two openings that allow a shaft member attached to an arm of the electric vehicle charging station to pass through, wherein a first segment of the spring clamp includes a first opening of the two openings and a portion that extends into the first opening, and wherein the portion that extends into the first opening slots into a cutout portion of the shaft member as the shaft member is passed through the two openings to latch the spring clamp onto the shaft member, and
      the compression pad that is attached to the housing of the cable tether for gripping the electric vehicle charging cable.

10. The electric vehicle charging station of claim 9, wherein the first segment of the spring clamp extends outside of the housing through a cutout portion of the housing, and wherein depressing the first segment from an initial location at a top of the cutout portion of the housing towards an ending location at a bottom of the cutout portion of the housing causes the spring clamp to disengage from the shaft member.

11. The electric vehicle charging station of claim 9, wherein the portion that extends into the first opening deforms during a breakaway event causing the housing to separate from the shaft member.

12. The electric vehicle charging station of claim 11, wherein the breakaway event is an application of a force greater than 285 pounds.

13. The electric vehicle charging station of claim 9, wherein a second segment of the spring clamp includes a second opening of the two openings and winged portions.

14. The electric vehicle charging station of claim 9, wherein a third segment of the spring clamp latches the spring clamp to the housing.

15. The electric vehicle charging station of claim 9, wherein the cable tether is suspended from the arm of the electric vehicle charging station when the spring clamp is latched onto the shaft member to allow the cable tether to rotate around a vertical axis.

16. The electric vehicle charging station of claim 9, wherein the housing further comprises:
   a first set of notches for holding the spring clamp; and a second set of notches for holding the compression pad, wherein the second set of notches accommodate different sizes of compression pads for different sizes of electric vehicle charging cables.

\* \* \* \* \*